United States Patent
Achs

[15] 3,654,876
[45] Apr. 11, 1972

[54] PALLET
[72] Inventor: Horst J. Achs, Prospect Heights, Ill.
[73] Assignee: Eaton Corporation, Cleveland, Ohio
[22] Filed: Dec. 11, 1969
[21] Appl. No.: 884,293

[52] U.S. Cl. ............................................................108/51
[51] Int. Cl. ..................................................B65d 19/18
[58] Field of Search ..............................................108/51–58

[56] References Cited

UNITED STATES PATENTS

| | | | |
|---|---|---|---|
| 1,612,382 | 12/1926 | Lehman | 108/58 |
| 1,806,428 | 5/1931 | Taris, Jr. | 108/52 UX |
| 2,232,991 | 2/1941 | Zeindler | 108/58 |
| 2,668,681 | 2/1954 | Karpen | 108/52 |
| 2,918,242 | 12/1959 | Olivette et al. | 108/51 |
| 3,172,374 | 3/1965 | Allen | 108/51 |
| 3,472,363 | 10/1969 | Rustin, Jr. et al. | 108/55 |

Primary Examiner—Bobby R. Gay
Assistant Examiner—Glenn O. Finch
Attorney—Yount & Tarolli

[57] ABSTRACT

A pallet for supporting material thereon includes a base having a substantially flat portion of a rectangular shape lying in a plane. The pallet has two opposing sides extending in one direction from the plane and forming flange portions for retaining the material supported by the pallet. The pallet also includes a reinforcing member secured to the base and which strengthens the pallet and provides a surface for supporting the material carried by the pallet.

2 Claims, 3 Drawing Figures

PATENTED APR 11 1972 3,654,876

INVENTOR
HORST J. ACHS

BY Yount and Tarolli
ATTORNEYS

PALLET

The present invention relates to a pallet for supporting material thereon, and more particularly relates to a pallet for use in conjunction with stacker cranes and automated warehousing systems.

Automated warehousing techniques have required the use of new equipment to automatically store and retrieve certain materials used in the warehousing operation. These warehousing systems allow material to be supplied to the warehouse and transported to a specific location in the warehouse by a stacker crane which is either manually operated or automatically operated by a computer. In order to place the pallets upon which the material rests in a predetermined position, it is necessary to locate each pallet in a tabulated or enumerated position. That specific pallet may be retrieved by returning the stacker crane to the tabulated or enumerated position and removing the pallet therefrom.

Due to specific constructions of these automated warehouses, it is desirable to have a pallet which has a flat bottom. This allows the stacker crane to insert and remove the pallet from its location and to reposition the pallet with a maximum of stability and minimum of effort. A flat bottom design allows the pallet to be received by arms of a support device to hold the pallet in its tabulated position. By so supporting the pallet when in its storage position, complicated positioning devices are not required to place or remove the pallet from its predetermined storage position. In addition, a simplified supporting device may be utilized thereby minimizing the cost of manufacturing such a support device.

The pallet of the present invention is readily adaptable for use with a stacker crane in an automated warehousing system and allows the material to be automatically moved from one position to another position by the stacker crane without disturbing the material supported by the pallet. The pallet of the present invention has a simplified construction and is easy to manufacture and thereby of low cost. The pallet has a flat reinforced bottom which is particularly adaptable to automatic warehousing techniques. Moreover, the pallet has side flanges for retaining material thereon.

Accordingly, the present invention relates to a simple low cost practical pallet for supporting material thereon and having a flat bottom and two opposing side flanges retaining material thereon.

It is an object of the present invention to provide a pallet for supporting material thereon including a base member which has two opposing side flange portions and flange members secured thereto for retaining material supported by the pallet thereon and a reinforcing member secured to the base and flange members to strengthen the pallet.

Further objects, advantages and features of the present invention will be apparent to those skilled in the art to which it relates from the following detailed description made with reference to the accompanying drawings forming a part of this specification and in which.

The present invention provides an improved pallet having a flat bottom and flange members for retaining the material supported by the pallet. A reinforcing member is secured to the base and flange members to strengthen the pallet. The improved pallet of the present invention is designed to be used in conjunction with a stacker crane for automatic warehousing. The present invention may be applied to pallets of a variety of constructions and designs and for purposes of illustration is described in connection with the drawings as applied to a pallet 10 shown in FIG. 1.

Figure 1:
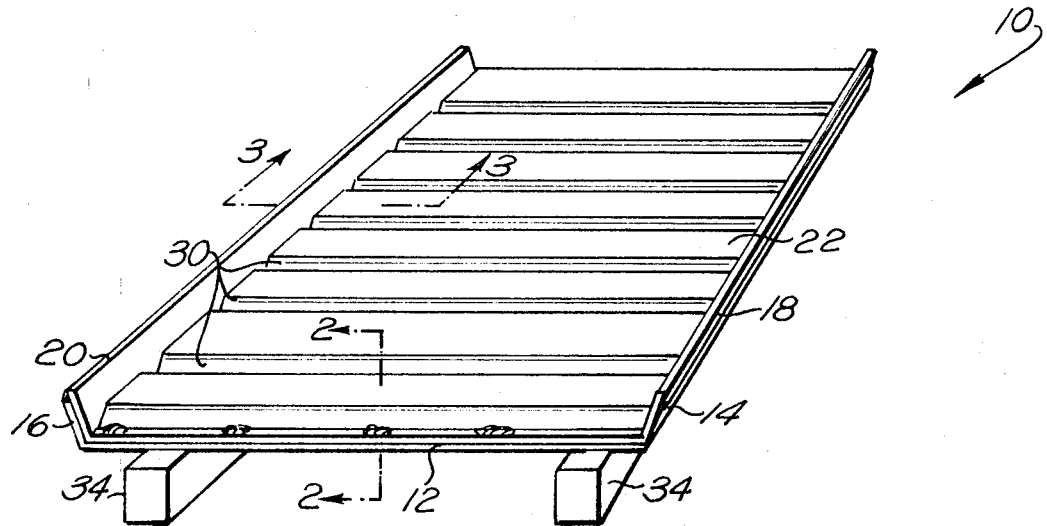
FIG. 1 is a perspective view of the pallet of the immediate invention supported by support arms.

The pallet 10, shown in FIG. 1, includes a base member 12 having opposing sides 14, 16 extending therefrom. Flange members 18, 20 are secured to the opposing sides 14, 16, respectively. The pallet 10 also includes a reinforcing member 22 secured to the base 12 and flange members 18, 20. The reinforcing member 22 also provides the material supporting surface 28 of the pallet 10.

Figure 2:
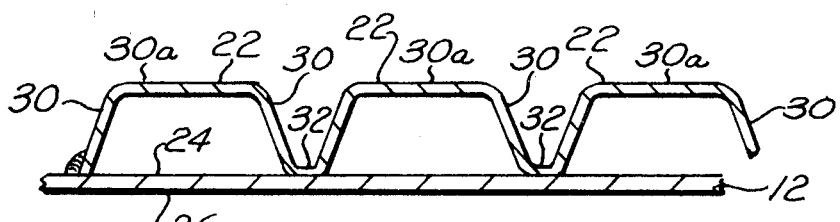
FIG. 2 is a fragmentary cross-sectional view of the pallet shown in FIG. 1 taken along lines 2—2 thereof.

The base member 12 is formed from sheet material and is generally rectangular in configuration. The base 12 has an upper side 24 and a lower side 26, as shown in FIG. 2. The lower side 26 defines the bottom of the pallet 10 and the upper side 24 defines a surface to which the reinforcing member 22 is secured. It should be understood that if additional strengthening of the pallet 10 is required, the base member 12 may be deformed. The deformations in the base member 12 of such a pallet should contact portions of the reinforcing member 22. It should further be understood that any such deformations in the base member 12 may be of any geometric configuration.

Figure 3:
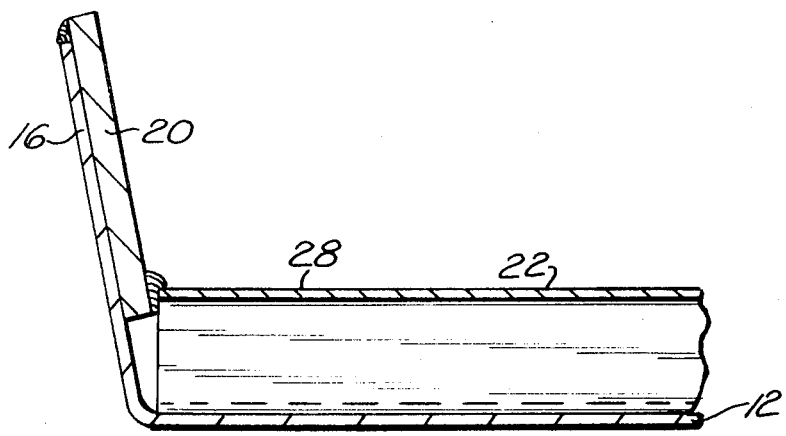
FIG. 3 is a fragmentary cross-sectional view of the pallet shown in FIG. 1 taken along lines 3—3 thereof.

The flange portions 14, 16 of the base 12 are similar in construction and for ease of description, only flange 16 will be described hereinafter as shown in FIG. 3. The flange 16 of the base 12 extends from the plane defined by the upper and lower surfaces 24, 26, respectively, of the base 12. Flange 16 extends from the plane defined by the upper surface 24 at an obtuse angle with respect thereto. The flange portion 16 extends from the upper surface 24 of the base 12 a sufficient distance so that the flange member 20 may be secured thereto. When material is positioned on the pallet, it need not be exactly positioned on the pallet and will be directed toward the material supporting surface 28 of the pallet by the flange members 18, 20 secured to and extending parallel to the flange portions 14, 16, respectively.

In order to minimize the cost of manufacturing the pallet 10, it is important to minimize the thickness of the sheet material, such as sheet metal, used in manufacturing the base 12 and reinforcing member 22. By using thin sheet metal material, it is also possible to provide a pallet 10 which is light weight in construction while having sufficient rigidity to support the material placed thereon.

The flange members 18, 20 are generally rectangular in configuration and are secured to the flange portions 14, 16 of the base 12 by any conventional means such as welding. These flange members 18, 20 provide the pallet 10 with sufficient lateral support to retain the material carried on the material supporting surface 28 of the pallet 10 due to any lateral shifts of the pallet or material thereon. Since the flange members 18, 20 are heavier material and secured to the flange portions of the base 12, they make the pallet rigid in the longitudinal direction of the pallet, i.e., the direction in which they extend. These flanges also, due to the fact that they converge as they extend toward the supporting surface 28, function to position material on the material supporting surface 28 if the material is not properly centered as it is placed on the pallet 10.

The reinforcing member 22 is a corrugated member formed from a piece of sheet material, such as sheet metal. The reinforcing member 22 includes a plurality of corrugations or reinforcing ribs 30. The portions 32 of the reinforcing member 22, interposed between the ribs or corrugations, engage the upper surface 24 of the base member 12. The upper surface 30a of each rib 30 forms the material supporting surface of the pallet 10. In the embodiment shown in FIGS. 1–3, the ribs 30 extend across the pallet 10 from one flange member 18 to the other flange member 20 and are welded thereto. These ribs provide structural rigidity in the longitudinal direction through which they extend. It should be understood that these ribs 30 resist bending and deformation of the pallet when the reinforcing member 22 is secured to the base 12 and flange members 18, 20.

It should be understood that the deformations of the reinforcing member 22 may assume many other configurations which lend structural rigidity to the pallet 10, such as a diamond configuration. Some other configurations could lend greater structural rigidity in other directions. It is apparent that the configuration of the deformations of the reinforcing member 22 depends on the use of the pallet 10.

From the above, it should be apparent that the pallet 10 is constructed of four parts, namely:

1. The base member 12;
2. Flange member 18 secured to the flange portion 14 of the base 12;
3. Flange member 20 secured to the flange portion 16 of the base 12, and
4. The corrugated reinforcing member 22 which is secured to the base member 12 and the flange members 18, 20.

This constitutes a simple construction which is rigid, durable, and capable of carrying heavy loads.

When the pallet 10 is used in conjunction with a stacker loader, the flat bottom of the pallet 10 allows itself to be positioned on supporting members 34 of the supporting device used in the automated warehouse. The stacker crane may position the pallet 10 on the support arms 34 or remove the pallet 10 therefrom by simply positioning a flat undercarriage or arms under the bottom 26 of the pallet 10.

It is apparent from the foregoing that the present invention provides a new and improved pallet 10 having a base 12 defining the bottom 12 of the pallet 10. The base 12 has two opposing sides which define flange portions 14, 16 to which flange members 18, 20 are attached. A reinforcing member 22 is secured to the base 12 and to the flange members 18, 20 to provide a pallet 10 having structural rigidity which is low in cost.

Having described my invention, I claim:

1. A pallet for supporting material thereon comprising a sheet metal base member having a flat base portion lying in a plane and opposing flange portions extending in the same general direction but from opposite edges of the base portion, flange members secured to said respective flange portions, and a sheet metal reinforcing member secured to said base portion and to said flange members; said reinforcing member comprising a corrugated member having a plurality of corrugations defining a material supporting surface extending between said flange members, and said flange members extending above said supporting surface and diverging above said surface.

2. A pallet for supporting material thereon comprising a sheet metal base member having a flat base portion of generally rectangular shape lying in a plane, said base member having opposing flange portions extending in a diverging manner from opposite edges of the base portion, flange members secured to said flange portions, and a sheet metal reinforcing member located between said flange portions and welded to said base member and said flange portion, said reinforcing member comprising a corrugated member having a plurality of corrugations which extend between said flange members to define the material supporting surface of the pallet.

* * * * *